Oct. 30, 1934.     E. G. CARROLL     1,978,669
DUAL BRAKE APPARATUS FOR AUTOMOBILES
Original Filed Aug. 20, 1927.
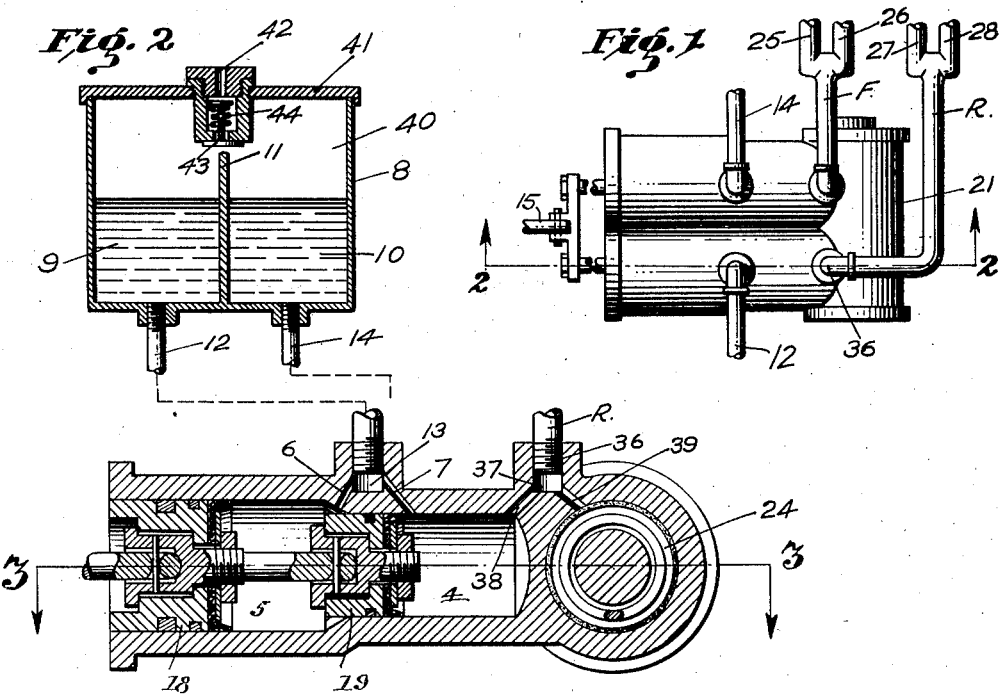
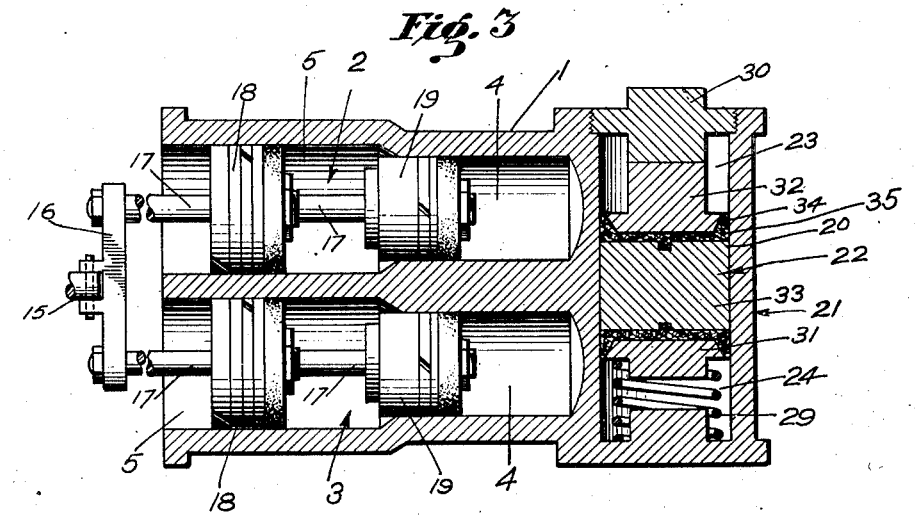
INVENTOR.
Eugene G. Carroll.
BY
ATTORNEYS.

Patented Oct. 30, 1934

1,978,669

UNITED STATES PATENT OFFICE 1,978,669

DUAL BRAKE APPARATUS FOR AUTOMOBILES

Eugene G. Carroll, Los Angeles, Calif., assignor, by mesne assignments, to Bendix Brake Company, South Bend, Ind., a corporation of Illinois Original application August 20, 1927, Serial No. 214,330. Divided and this application February 5, 1929, Serial No. 337,564. Renewed September 3, 1932

17 Claims. (Cl. 60—54.6)

This invention relates to a fluid brake apparatus and is intended especially for use on automobiles. This application is a division of my co-pending application Serial No. 214,330, Patent No. 1,770,064, granted July 8, 1930.

In operation of automobile brakes of the four-wheel type, it has become recognized as bad practice to have the front wheels "braked" with greater force than the rear wheels. In fact, the braking action should be greatest on the rear wheels. One of the objects of this invention is to provide an apparatus which will automatically insure that the braking effect on the front wheels will be less than that on the rear wheels; also to construct the apparatus in such a way that in case the braking apparatus for the rear wheels, or for the front wheels, should become inactive then the braking apparatus for the other wheels will continue to function effectively.

Accidents have occurred in using fluid operated brakes due to the fact that one of the forward brakes will operate and the other forward brake fails to operate, thereby tending to steer the car to one side. One of the objects of this invention is to provide an apparatus in which the two forward brakes receive their pressure from the same source, so that if the pressure in one of the forward brakes fails, the pressure in the other forward brake will also fail.

In other words, according to my invention, I provide a dual system for the rear wheel brake cylinders and for the front wheel brake cylinders, connected up in such a way that there is a regulating pressure connection between the two apparatuses preventing the application of too great power to the front wheels, but enabling it to continue to function properly in case the front wheel braking apparatus gets out of order, and vice versa; and this is accomplished automatically and without any adjustment or attention being necessary from the driver of the car.

Further objects of the invention will appear hereinafter.

The invention consists in the novel parts and combination of parts to be described hereinafter, all of which contribute to produce an efficient dual brake apparatus for automobiles.

A preferred embodiment of the invention is described in the following specification, while the broad scope of the invention is pointed out in the appended claims.

In the drawing:

Figure 1 is a plan showing a twin cylinder construction with connections to lead to the rear and front wheels.

Figure 2 is a longitudinal section taken on the line 2—2 of Figure 1 and further illustrating details of the apparatus. This view also illustrates a dual reservoir which may be used with this type of twin cylinder.

Figure 3 is a horizontal section taken on the line 3—3 of Figure 2.

In practicing the invention, I provide cylinder means, including means for developing pressure therein in the operating fluid.

In order to provide for inhibiting the remaining forward brake from operating in case the other forward brake fails to operate, I provide a pipe leading from the cylinder means, with a branch corresponding to each forward wheel. For a similar purpose I provide another pipe leading from the cylinder means, having a branch corresponding to each of the rear wheels.

In order to provide for developing a slightly reduced pressure in the forward brakes, so that they will be applied with less force than the rear brakes, I employ a "forward" pressure chamber and a "rear" pressure chamber, the former of which supplies the fluid under pressure to the forward brakes, and the latter of which supplies the fluid under pressure to the rear brakes.

I provide automatic means for maintaining a certain regulation or relation of the pressures of these two pressure chambers, and this means is preferably constructed so that the apparatus will continue the operation of either the forward set or the rear set of brakes in case the other set becomes inoperative.

While the cylinder means may be constructed as a single cylinder, I prefer to construct it of dual, or twin, type.

I shall now describe the preferred construction for attaining these effects.

I provide cylinder means 1, preferably of twin type so that two cylinders 2 and 3 are provided with parallel axes. If desired, these cylinders may be cast in a block. I prefer to construct each of these cylinders, 2 and 3, with a forward bore 4 of reduced diameter, and a rear bore 5 of slightly larger diameter, and connect the two bores by means of by-pass ports 6 and 7 formed in the cylinder walls. (See Figure 2.) These bores are supplied with a fluid, preferably a liquid, which I prefer to carry in a twin type reservoir 8 having two chambers 9 and 10 alongside of each other and separated by a dividing wall 11. The chamber 9 is connected by a pipe connection 12 with a small chamber 13 formed at the junction point of the ports 6 and 7. In a similar way the reservoir 10 is connected by a pipe connection indicated at 14 with a similar chamber 13 of the other twin cylinder. (See Figure 2.)

The brake pedal that applies the brakes exerts thrust in a rod 15 that is attached to a cross-head 16, and this cross-head is attached to piston rods 17 that extend into the two twin cylinders 2 and 3, said rods being located on the axes of the cylinders. The piston rods 17 carry pistons 18 and 19, the former of which is located in the relatively large bore 5 and the latter of which is located in the bore 4 of relatively small diameter.

The cylinders 4 communicate with an equalizing chamber 20 which may be formed in a cross-cylinder 21 cast en bloc with the twin cylinders 2 and 3, and the ends of this chamber communicate respectively with the twin cylinders 2 and 3.

I provide means for regulating the relative pressure in the two ends of the pressure chamber 20. For this purpose I prefer to employ a movable piston 22 in the bore of the cylinder 21 which divides the chamber 20 into two separated chambers, namely, a chamber 23 which I call a "forward" chamber, and a chamber 24 which I call a "rear" chamber. The chamber 23 is connected by a pipe F with branches 25 and 26 that connect respectively to the two forward brake cylinders. A similar pipe connection, R, is connected to the chamber 24, and this pipe has branches 27 and 28 that connect respectively to the rear brake cylinders. The piston 22 is normally held by a spring in an extreme position. This spring is mounted so that it urges the piston 22 in a direction to diminish the volume in the chamber 23. This spring has little force and is a return spring of just sufficient strength to overcome the friction of the piston 22. With this arrangement it will be evident that if the pressure in the chamber 23 (communicating with the front wheels) tends to increase, this pressure will move the piston 22 toward chamber 24, thereby enlarging the chamber 23, and this will automatically reduce the pressure of the liquid or fluid serving the forward brakes.

In the present instance the spring is in the form of a coil spring 29 located in the chamber 24, and this spring normally holds the piston 22 over against a plug 30 screwed into the opposite end of the cross-cylinder 21.

The piston 22 may be of any suitable construction. In the present instance it is constructed of two separated heads 31 and 32 with a body 33 located between them. The inner ends of the heads 31 and 32 have tapered or conical integral collars 34, which exert their pressure against cup leathers 35, which operate as packing to prevent leakage between the two chambers 23 and 24.

The pipes F and R are connected to their corresponding ends of the cylinder 21 preferably as indicated in Figure 2, each pipe terminating in a connection 36 screwed into a boss located opposite the inner ends of the bores 4 and communicating with a small chamber 37 in the boss, which connects by ports 38 and 39 with the bore 4 and the corresponding chamber of the cross-cylinder.

I prefer to provide an air chamber 40 in the reservoir 8, which is constructed to retain air under pressure. This pressure may be maintained at any desired point, for example, five or six pounds per square inch above atmospheric pressure. For this purpose the reservoir 8 is preferably provided with an air-tight cover 41 which is preferably provided with an air inlet 42 and a check-valve 43 opening inwardly and normally held closed by a light coil spring 44. With this construction it will be evident that in case the air pressure in the air chamber 40 ever drops below atmospheric pressure, the check-valve 43 would open automatically and admit more air.

The ports 7 admit fluid into the forward bores 4 just forward of their pistons 19. In the operation of the brake, when the cross-head 16 is actuated, the fluid displaced by each of the larger pistons 18 flows through the port 6 into the corresponding small chamber 13, raising the level of the liquid in the chambers 9 and 10 of the reservoir 8 and slightly increasing the pressure, both hydrostatic and pneumatic, in the system. This increase of pressure is, of course, of a differential nature, because each forwardly moving small piston 19 is increasing the volume of its respective chamber 5. However, there is an increase of pressure developed which is communicated to the forward bore 4 until the port 7 closes. As soon as this port closes, a considerably higher pressure is immediately developed in the forward bores 4, which are cut off from communication with their reservoirs. This applies the braking pressure through the pipes F and R to the forward and rear brake cylinders.

If there is any tendency for the pressure in the chamber 23 to become higher than its proper working pressure relative to the pressure in chamber 24, then a displacement of the piston 22 would take place in a direction to compress the spring 29 and enlarge the chamber 23. This would automatically reduce the pressure in the liquid serving the forward brakes. This is advantageous because it is desirable to have somewhat less braking force applied to the forward wheels.

If desired, a pressure gauge can be provided on the cover 41 for indicating the pressure existing in the brake apparatus.

If one of the forward brakes should leak so that the brake would not be applied, the reduction in pressure incidental to the leak would be communicated through its branch pipe to the other forward brake, so that the pressure in the two forward brake cylinders is always equalized. This prevents either forward brake being applied with greater force than the other. And, if one forward brake fails by loss of pressure, so will the other. This is also true of the rear brakes, but the forward set of brakes can become inoperative without affecting the operativeness of the rear brakes. In case the rear brakes failed, the piston 22 would move over against the other end of chamber 24, (see Figure 3) thereby decreasing the pressure in the system serving the forward brakes. A decreased braking effect in the forward wheels would result, and this is desirable when they are the only brakes operating on the car.

This apparatus automatically develops working pressure in the air chambers. This occurs by reason of the fact that when first put into use the return movement of the pistons 18 will develop a partial vacuum in the chambers 5. This will cause atmospheric air to leak in. In this way the pressure will be built up.

The surfaces of contact between the plug 30 and the head 32 are rough, unfinished faces, that is to say, they are not machined faces, and consequently when the head 32 seats against the plug 30, as illustrated in Figure 3, the contact between these two parts is limited to a point or several points so that there is substantially no area cut off from the pressure in the chamber 23 against the seating face of the head 32. For this reason it is not possible for the head 32 to become set permanently against the plug 30. Furthermore, when the piston 22 is moved by the pressure in the chamber 23 in a direction to reduce volume of the chamber 24, the head 31 should never move far enough to seat against the adjacent head of the cylinder. The chamber 24 is long enough, measured along the axis of the piston, to prevent this. The safe length of the chamber as regards this point is determined by the capacity of the pipes and brake cylinders. In any case, the length of this chamber should be sufficient to prevent such a seating of the head 31 in its movement that compresses the spring 29.

It is understood that the embodiment of the invention described herein is only one of the many embodiments this invention may take, and I do not wish to be limited in the practice of the invention, now in the claims, to the particular embodiment set forth.

What I claim is:

1. In a four-wheel fluid brake apparatus for automobiles, the combination of means for developing pressure in the operating fluid, a movable equalizing piston with a chamber on each side of the same receiving the operating fluid, and means for normally holding the equalizing piston yieldingly in an extreme position with respect to one of said chambers, a connection from one of said chambers to the forward braking cylinders and a connection from the other chamber to the rear braking cylinders.

2. In a four-wheel fluid brake apparatus for automobiles, the combination of cylinder means including means for developing pressure therein in the operating fluid, a chamber receiving fluid from the cylinder means and corresponding to the forward wheels, another chamber receiving fluid from the cylinder means and corresponding to the rear wheels, means movably mounted in the space between the chambers for constantly separating the chambers from each other and preventing the passage of liquid from one to the other for regulating the relative pressures in said chambers, a pipe connection connecting the first of said chambers with the forward wheels, and a pipe connection connecting the other of said chambers with the rear wheels.

3. In a four-wheel fluid brake apparatus for automobiles, the combination of cylinder means including means for developing pressure therein in the operating fluid, a chamber receiving fluid from the cylinder means and corresponding to the forward wheels, another chamber receiving fluid from the cylinder means and corresponding to the rear wheels, a movable piston separating the said chambers from each other, a spring urging the piston toward the chamber corresponding to the forward wheels and operating to yield if the pressure tends to rise above a predetermined brake pressure in the "forward" chamber, thereby enlarging the "forward" chamber and preventing the rise of the pressure in the "forward" chamber above the predetermined brake pressure.

4. In a four-wheel fluid brake apparatus for automobiles, the combination of cylinder means including means for developing pressure therein in the operating fluid, a "forward" chamber receiving fluid from the cylinder means and corresponding to the forward wheels, a "rear" chamber corresponding to the rear wheels and receiving fluid from the said cylinder means, a movable piston separating the said chambers and a spring urging the piston in one direction and yielding to permit enlargement of the "forward" chamber.

5. In a four-wheel fluid brake apparatus for automobiles, the combination of a master cylinder of twin type having two twin cylinders side by side, each of said cylinders having a chamber with its corresponding piston means, means for advancing both of said piston means simultaneously, a "forward" chamber adjacent to the chamber of one of said twin cylinders, with a connecting port, receiving fluid under pressure from one of said twin cylinders, a "rear" chamber adjacent the other twin cylinder with a connecting port receiving fluid under pressure from the other of said twin cylinders, a pipe connection from the "forward" chamber to the forward wheels, a pipe connection from the rear chamber to the rear wheels, and means for controlling the relative pressures in the two chambers.

6. In a fluid brake system for automobiles, the combination of a plurality of master cylinders, means for developing fluid pressures in said cylinders, a connection between said cylinders, and means comprising a floating fluid tight piston in said connection for constantly separating the portions of said connection which lead to said cylinders respectively.

7. In a fluid brake system for operating fluid motors associated with the brakes, a master cylinder means, movable means for dividing said master cylinder means into a pair of compartments and preventing the flow of fluid from one compartment to the other, a piston in each compartment, connections between one of said compartments and one of said fluid motors, connections between another of said compartments and another of said fluid motors, means for normally maintaining superatmospheric pressure in said system, means cooperating with said pistons and with said movable means for producing substantially equal pressures in said compartments so long as the pressures remain superatmospheric in both of said compartments, and means for limiting the movement of said dividing means to prevent dissipation of pressures in one of said compartments consequent upon dissipation of pressure in the other compartment.

8. In hydraulic brake apparatus, forward brakes and rear brakes, a master cylinder means having a plurality of compartments, means in each of said compartments for developing hydraulic pressure therein, fluid pressure connections between one of said compartments and said forward brakes, and a fluid pressure connection between another said compartment and said rear brakes, a cylindrical chamber having one end communicating with each of said compartments and a fluid tight floating piston positioned in said cylindrical chamber.

9. In hydraulic brake apparatus, a plurality of brakes, a pair of master cylinders, arranged substantially parallel to each other, a transverse cylinder having one end connected with each of said first named cylinders, a fluid tight floating piston in said transverse cylinder, a fluid connection between one of said parallel cylinders and one of said brakes, and a fluid connection between the other of said parallel cylinders and another of said brakes.

10. In hydraulic brake apparatus, a master cylinder, a wheel cylinder, fluid connections between said master cylinder and said wheel cylinder, a supply reservoir having an opening to the atmosphere in the upper part thereof and having a check valve therein whereby air may be drawn into said reservoir and whereby fluid may be prevented from passing out of said reservoir, said cylinder having a piston therein adapted to be reciprocated for supplying operating pressure to said wheel cylinder, and having a second different sized piston positioned rearward of said first named piston also adapted to be reciprocated and connections between said master cylinder and said reservoir leading to said cylinder at a point between the pistons whereby the pressure in said reservoir is alternately raised and lowered by reason of the reciprocation of said pistons.

11. A fluid pressure braking means involving independent hydraulic systems, manual means for creating braking pressure in said systems, and a balancing device intermediate the systems and including a floating piston serving to prevent fluid interchange between the systems, the movement of the piston in one direction under a limited excess pressure in one system serving in such movement to tend to balance the pressures in the respective systems.

12. A fluid pressure braking means involving independent hydraulic systems, manual means for creating braking pressure in said systems, and a balancing device intermediate the systems and including a floating piston responsive to the pressure of each system and serving to prevent fluid interchange between the systems, the movement of the piston in one direction under a limited excess pressure in one system serving in such movement to tend to balance the pressures in the respective systems.

13. A fluid pressure braking means including independent hydraulic brake controlling systems, a balancing device for equalizing pressure between the systems including a floating piston responsive to an excess pressure in one of the systems and moving under such excess pressure to increase the pressure in the other system and reduce the pressure in the first mentioned system to a pressure balancing point, and means for limiting pressure responsive movement of the piston in either direction to prevent pressure exchange between the systems beyond a predetermined limit of pressure variation in the respective systems.

14. A fluid pressure braking means including independent brake controlling hydraulic systems, a pressure balancing means between the systems including a cylinder closed at the respective ends, a piston operative within the cylinder and normally defining chambers beyond each end of the piston, each pressure system including one of said chambers, the piston floating with respect to the chambers and responsive to variation in pressure in the chambers, said piston further preventing fluid exchange between the chambers, said piston under variation in pressure in one of the chambers and thereby in the system of which said chamber forms a part moving to reduce the normal volume of the other chamber to thereby increase the pressure in such other chamber and in the system in which said other chamber forms a part.

15. A fluid pressure braking means including independent brake controlling hydraulic systems, a pressure balancing means between the systems including a cylinder closed at the respective ends, a piston operative within the cylinder and normally defining chambers beyond each end of the piston, each pressure system including one of said chambers, the piston floating with respect to the chambers and responsive to variation in pressure in the chambers, said piston further preventing fluid exchange between the chambers, said piston under variation in pressure in one of the chambers and thereby in the system of which said chamber forms a part moving to reduce the normal volume of the other chamber to thereby increase the pressure in such other chamber and in the system in which said other chamber forms a part, and means for limiting pressure responsive movement of the piston in either direction.

16. In a hydraulic braking system, in combination a plurality of fluid operated brake mechanisms, a master cylinder and a piston therein for producing fluid pressure associated with each of the brake mechanisms, a cylinder and a piston therein common to said brake mechanisms and master cylinders, packing cups for said piston, heads for said piston, means engageable with said heads for limiting the range of movement of said piston, a coil spring for holding said cups in a manner to prevent leakage of fluid past said piston and for normally holding one of said heads spaced from one of said limiting means to permit a predetermined movement of said piston by a differential in pressure in said brake mechanisms due to variations in adjustment of the brake mechanisms to limit the pressure of one of said master cylinders.

17. In a hydraulic braking system, in combination a plurality of fluid operated brake mechanisms, a master cylinder and a piston therein for producing fluid pressure associated with each of the brake mechanisms, a common cylinder and a piston therein interposed between said master cylinders and brake mechanisms, packing cups seated on opposite faces of said piston, a head for said piston, means engageable with said head for limiting the range of movement of said piston, means yieldingly urging said piston to a position such that the piston may be moved in one direction by a differential in pressures in said brake mechanisms due to variations in adjustment of the brakes of said brake mechanisms to limit the pressure of one of said master cylinders relative to the other.

EUGENE G. CARROLL.